United States Patent Office 2,890,412
Patented June 9, 1959

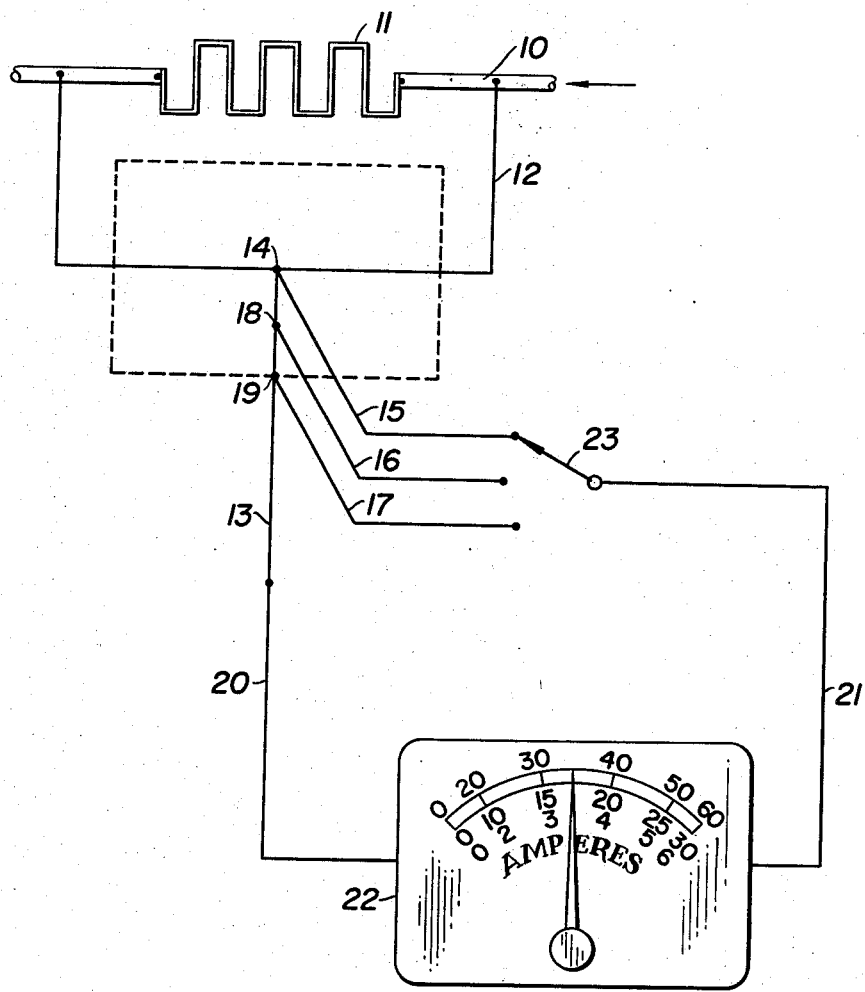
INVENTOR.
WILLIAM W. WOODRUM
BY Richard H. MacCutcheon
ATTORNEY

2,890,412
METHOD OF CALIBRATING AN ELECTRICAL INSTRUMENT

William W. Woodrum, Maple Heights, Ohio, assignor to Assembly Products, Inc., Chesterland, Ohio, a corporation of Ohio Application November 14, 1955, Serial No. 546,412

1 Claim. (Cl. 324—74)

The present invention relates to thermocouple structure and circuits employing the same.

Previously there has been a problem in calibrating voltage responsive apparatus such as meters when used in connection with thermal batteries.

It is an object of the present invention to provide simple means for overcoming the above mentioned difficulty.

Where a thermocouple is used to measure the temperature of a concentrated heat source, such as of a point along a "hot wire," I have found calibration may readily be made by employing a plurality of thermocouple junctions progressing away from the heat source along a "heat drop" conductor which conveniently may be the "common" one of the dissimilar material conductors for all of the thermocouples, and then selecting which one of the junctions is to be used according to characteristics of the entire circuit as such characteristics become known e.g. during assembly of the apparatus, or as it may be desired that such characteristics be changed according to input or the like.

This may be more clear from consideration of the following description taken in connection with the accompanying drawing in which the single figure is a schematic representation of thermocouple structure and circuitry according to the invention.

In the drawing 10 represents a wire assumed to carry a high amperage current which may, for example, be of radio frequency so that ordinary ammeter techniques may not be employed in seeking to measure its value. A voltage drop grid or "shunt" 11 is arranged in series with wire 10 to carry the bulk of the current in known manner to set up a potential difference to force a small current around the main grid and through a "hot wire" 12 so that current can be measured by temperature. For the purpose of understanding the present invention conductor 12 may be considered as a first or main current carrying conductive element.

A second conductive element is a wire 13 of one material, for example, constantin, with one end attached to the "hot wire" and extends generally away therefrom to serve as a heat drop conductor. A plurality of wires 15–17 of a material dissimilar to that of 13 are connected to wire 13 progressively away from the heat source, e.g., at 14, 18 and 19, respectively. The circuit is completed by external wires such as 20, 21 and through a voltage measuring instrument such as the galvanometer indicated at 22. Selection of which thermocouple is to be used can be made by the assembler during manufacturing, as by a "touch" test before soldering, or if desired a selector switch as indicated at 23 can be employed so that the voltage responsive meter, which may as shown be calibrated to read 0–6, 0–30, 0–60 amperes in the main wire 10, may be made more or less sensitive according to the actual amount of current in such main wire, and to be measured according to proportions which depend neither on voltage nor current ratios alone, but also depends on heat drop serieswise along the common wire 13. Such an arrangement simplifies calibration whether by an assembler during manufacture or by an operator during use and is much less expensive and more trouble-free than trying to vary a voltage tap, or to short out turns in a current shunt as heretofore often done.

While I have illustrated and described a particular embodiment of the invention, various modifications may obviously be made without departing from its true spirit and scope which I intend to define in the appended claim.

I claim:

Method of calibrating a voltage responsive instrument with respect to a first or main current carrying conductive element, which method comprises selecting two materials dissimilar from each other for plural conductors as commonly used for thermocouples, providing a second conductive element of one of said dissimilar materials with an end thereof joined to a point on the first element and with the second element extending therefrom generally away from the first, providing plural additional conductive elements each of the other of said dissimilar materials and each with one end thereof attached to a different point on the second mentioned element to provide plural thermocouple junctions progressing away from the first element along the body of the second element to cause the latter to act as a heat drop conductor, and finally selecting which of the thermocouple junctions thus provided is to be used to feed a predetermined voltage responsive instrument, whereby to simplify calibration of the voltage responsive instrument with respect to current in the first or main current carrying conductive element.

References Cited in the file of this patent
UNITED STATES PATENTS

| | | |
|---|---|---|
| 705,187 | Zeleny | July 22, 1902 |
| 1,206,304 | Chubb | Nov. 28, 1916 |
| 1,435,819 | Des Isles | Nov. 14, 1922 |
| 2,100,260 | Miller | Nov. 23, 1937 |
| 2,279,043 | Harrington | Apr. 7, 1942 |
| 2,730,892 | Bruce et al. | Jan. 17, 1956 |
| 2,825,222 | Stone | Mar. 4, 1958 |